G. MATEER.
REAMING MACHINE.
APPLICATION FILED MAR. 23, 1911.
1,009,764.
Patented Nov. 28, 1911.
2 SHEETS—SHEET 1.
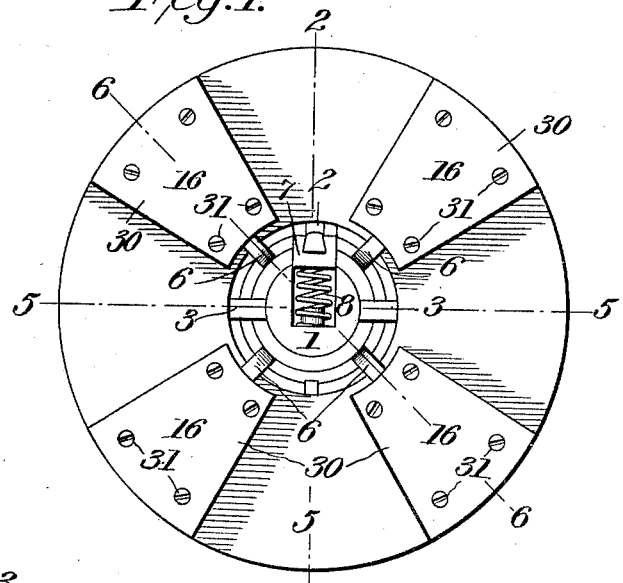
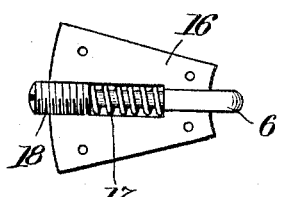
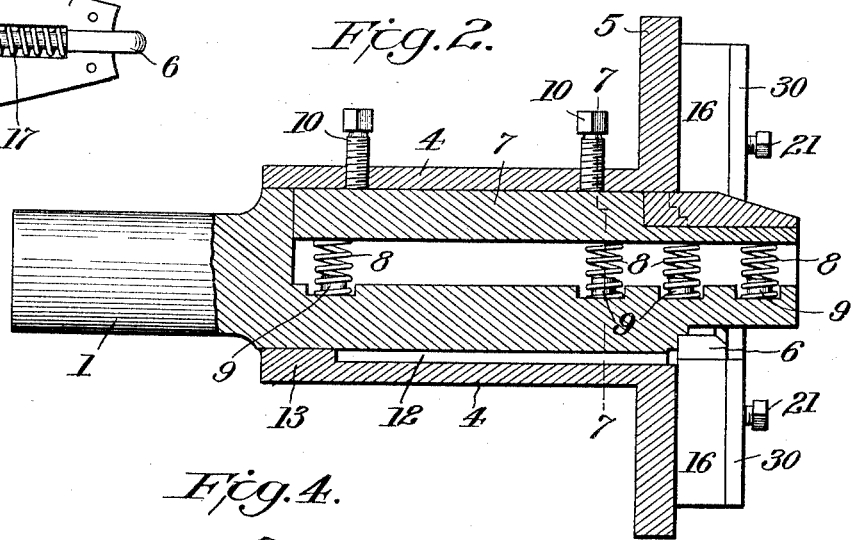
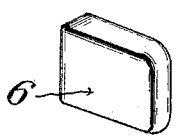
Witnesses
C. H. Walker.
R. I. Hulsizer.
Inventor
George Mateer
By Byrnes Townsend & Brickenstein
Attorneys

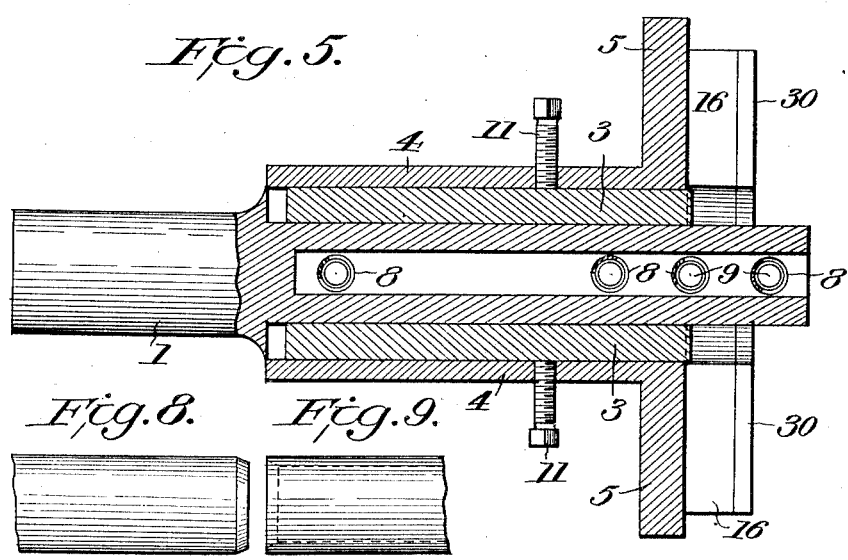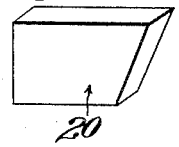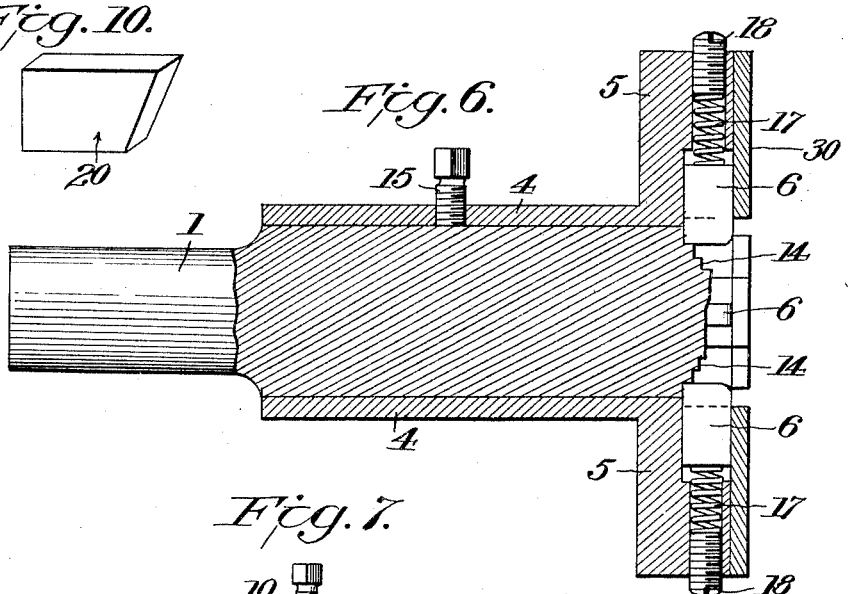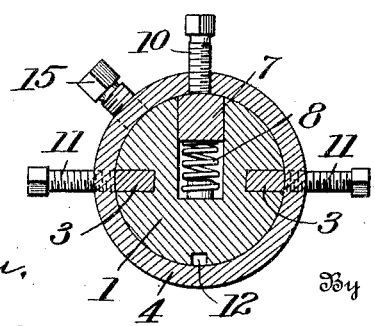

UNITED STATES PATENT OFFICE.

GEORGE MATEER, OF COATESVILLE, PENNSYLVANIA.

REAMING-MACHINE.

1,009,764.  Specification of Letters Patent.  Patented Nov. 28, 1911.

Application filed March 23, 1911.  Serial No. 616,511.

*To all whom it may concern:*

Be it known that I, GEORGE MATEER, a citizen of the United States, residing at Coatesville, in the county of Chester and State of Pennsylvania, have invented certain new and useful Improvements in Reaming-Machines, of which the following is a specification.

My invention relates to a reaming machine or tool for removing the burs formed on sections of pipes or tubes when they are sawed crosswise. These burs as left by the saw may be on the inside or outside of the end of the sawed pipe or on the end itself, and it is the object of my invention to remove these burs and leave a smooth surface.

As pipes or tubes, such as boiler tubes, often vary in the thickness of wall, it is a further object of my invention to provide means whereby the reaming tool or machine will automatically adjust itself to operate on tubes of varying wall thickness.

It is a further object of my invention to so arrange my reaming machine or tool that the ends of the tubes may not only have the burs removed, but be scarfed with either male or female ends in case they are to be welded.

These and other objects I attain by means of the mechanism shown in the accompanying drawings, in which:—

Figure 1 is a top plan view of the device; Fig. 2 is a section on the plane 2—2 of Fig. 1; Fig. 3 is a section on the plane 3—3 of Fig. 1; Fig. 4 is a perspective view of one of the outside cutting tools; Fig. 5 is a section on the plane 5—5 of Fig. 1; Fig. 6 is a section on the plane 6—6 of Fig. 1, the upper portion of the central shaft being broken away; Fig. 7 is a section on the plane 7—7 of Fig. 2; Figs. 8 and 9 are views showing the tubes with scarfed ends; and Fig. 10 is a view of a scarfing tool.

Referring more particularly to the drawings, the device comprises a central shaft 1, which carries the inside bur-removing tool 2, and the end bur-removing tools 3, 3, and a sleeve 4, surrounding said shaft, this sleeve having a flange 5, which carries the outside clearing tools. This shaft 1 has, as shown in Figs. 1 and 2, a groove or slot, within which is a tool-carrying bar 7, normally pressed outward by springs 8, set in depressions in the bottom of the groove and around pins 9 in said depressions. Set-screws 10, 10, passing through the wall of the sleeve determine the limit of outward movement of the bar and may be used to hold the scarfing tool in place as hereinafter described. The tool 2 is mounted in a dovetail groove at the upper end of this bar. The shaft 1 also has grooves for the bur-removing tools, 3, 3, which engage the end of the tube, these tools 3, 3, being adjustable, and held in place when adjusted by set-screws 11, 11. A key-way 12 (Fig. 2), in the shaft engages a lug 13 on the inside of the sleeve 4, and prevents the sleeve from rotating on the shaft. At its upper end, the shaft is of less diameter, and has a series of steps 14, to control the limit of inward movement of the outside clearing tools 6, 6, thereby enabling the machine to be used for several sizes of pipe. A set-screw 15 enables a longitudinal adjustment of the shaft and sleeve to be effected.

On the flange are mounted a series of boxes 16, in which are mounted, as shown in Fig. 3, the outside bur-removing tools 6. 30, 30 are covers for said boxes held in place by screws 31, 31. Springs 17 abutting against set-screws 18 normally press these tools 6 inwardly. The tools 2 and 6 have beveled upper portions, so that the end of the pipe will force them backward when the pipe-end is inserted into the device.

The operation of the device will be apparent. The reaming machine having been secured by its lower extension into a chuck or holder of any suitable character is rotated. The pipe-end to be reamed is then pushed into the reaming machine, the tools 6 engaging its outer surface, the tool 2 its inner surface, and the tools 3 its end, thereby neatly removing the burs. The yielding tools 2 and 6 adapt themselves readily to the varying thicknesses of the pipe walls. The stepped portions of the shaft prevent the outer tools from moving inward so far as to injure the outer surface of the pipe-end.

When the ends of the pipe are to be scarfed on the outside, the burring tools 6 and springs are removed, and suitably shaped scarfing tools 20 (Fig. 10) are substituted and held in adjusted position by any suitable means, as set-screws 21, 21, (Fig. 2), and the covers 30, 30 of the box.

When the ends of the pipe are to be scarfed on the inside, the outside bur-removing tools 6, 6, are inserted in their holders, but without the springs, and set up just enough to form a circular guide for the tube. The inside bur-removing tool-holder 7 and its springs are removed, and a liner is inserted into the slot, the liner being thick enough to bring the scarfing tool up to the desired height; the tool-holder is placed on top of the liner, and the parts held in place by the set-screws 10, 10. By inserting in the tool-holder a properly shaped scarfing tool, the machine is then ready for inside scarfing.

It will be noted that the machine above described is adapted for use with several sizes of pipe, and that it automatically adjusts its bur-removing tools to the varying wall thickness which is bound to occur even in pipes or tubes normally of the same size or diameter.

I wish it to be understood that while I have in the claims referred to "bur-removing means," said term is intended to include also the scarfing arrangement above referred to. It is also evident that my reaming machine may be itself rotated and the tube held stationary; or the machine may be fixed and the pipe to be reamed rotated.

What I claim is:

1. A bur-removing device comprising a member having inwardly spring-pressed bur-removing means arranged to engage the outside portion of the end of the tube, and a second member having outwardly spring-pressed bur-removing means for engaging the inside portion of the end of the tube.

2. A bur-removing device comprising a member having inwardly spring-pressed bur-removing means arranged to engage the outside portion of the end of the tube, means for limiting the inward movement, and a second member having outwardly spring-pressed bur-removing means for engaging the inside portion of the end of the tube.

3. A bur-removing device comprising a member having inwardly spring-pressed bur-removing means arranged to engage the outside portion of the end of the tube, and a stop for limiting the inward movement of said bur-removing means.

4. A bur-removing device comprising a member having inwardly spring-pressed bur-removing means arranged to engage the outside portion of the end of a tube, and a series of stops for limiting the inward movement of said bur-removing means.

5. A bur-removing machine comprising a shaft, a tool-holder mounted in a slot in said shaft, a sleeve surrounding said shaft, said sleeve carrying tool-holders, the tool-holders being constructed and arranged to hold tools for engaging the inner and outer surfaces of a pipe or tube.

6. A bur-removing machine comprising a shaft, a tool-holder resiliently mounted in a slot in said shaft, a sleeve surrounding said shaft, said sleeve carrying tool-holders, the tool-holders being constructed and arranged to hold tools for engaging the inner and outer surfaces of a pipe or tube.

7. A bur-removing machine comprising a shaft, an outwardly spring-pressed tool mounted in said shaft, a sleeve surrounding said shaft, said sleeve carrying inwardly spring-pressed tools.

8. A bur-removing machine comprising a shaft, an outwardly spring-pressed tool mounted in said shaft, a sleeve surrounding said shaft, said sleeve carrying inwardly spring-pressed tools, said shaft having also means for limiting the inward movement of said last mentioned tools.

9. In a reaming machine, a shaft having a slot therein, a tool-holder in such slot, and springs located between the tool-holder and the bottom of the slot.

10. In a reaming machine, a member carrying a series of inwardly-directed tool-holders, tools in said holders, and compression-springs between the tools and the holders.

11. A bur-removing machine comprising a shaft having mounted therein a bur-removing tool arranged and adapted to remove burs from the interior of a tube and also mounted therein a tool arranged and adapted to remove burs from the end of the tube, and a carrier having a tool thereon adapted and arranged to remove burs from the exterior of the tube.

12. A bur-removing machine comprising a shaft having mounted therein a resiliently mounted bur-removing tool arranged and adapted to remove burs from the interior of a tube and also mounted therein a tool arranged and adapted to remove burs from the end of the tube, and a carrier having a resiliently mounted tool thereon adapted and arranged to remove burs from the exterior of the tube.

13. A bur-removing machine comprising a shaft having mounted therein an outwardly-directed bur-removing tool, a carrier having mounted thereon an inwardly-directed resiliently-mounted bur-removing tool, said shaft having a stepped portion for engagement with the end of said last-mentioned tool.

In testimony whereof, I affix my signature in presence of two witnesses.

GEORGE MATEER.

Witnesses:
ROBT. H. BERNAU,
JOHN DINKELBERG.

---

Copies of this patent may be obtained for five cents each, by addressing the "Commissioner of Patents. Washington, D. C."